Figure 1:
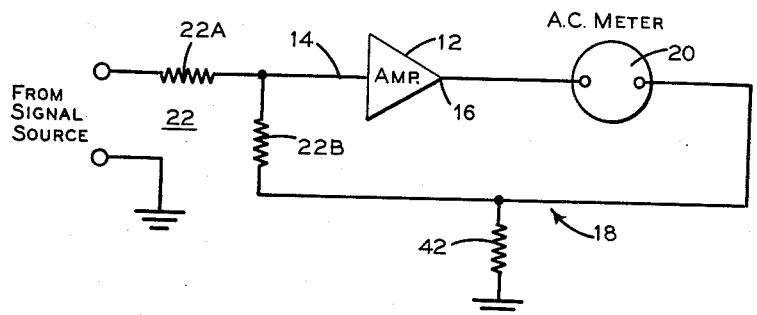

Nov. 6, 1962

J. WORTHING 3,063,009

SIGNAL MEASURING APPARATUS

Filed Jan. 22, 1959

SIGNAL MEASURING MEANS 10

INVENTOR.
Jurgen Worthing

BY S.C. Yuter

ATTORNEY

United States Patent Office 3,063,009
Patented Nov. 6, 1962

3,063,009
SIGNAL MEASURING APPARATUS
Jurgen Worthing, 75 Weaving Lane, Wantagh, N.Y.
Filed Jan. 22, 1959, Ser. No. 788,415
3 Claims. (Cl. 324—123)

This invention pertains to signal measuring apparatus and more particularly to apparatus for measuring the amplitudes of alternating-current signals.

In general, there are three ways for specifying the amplitude of an alternating-current signal; the first by specifying the peak value of the alternating-current signal; the second by specifying the average value of the alternating-current signal; and the third by specifying the root-mean-square value of the alternating-current signal. Root-mean-square means the square root of the time average of the square of the measured quantity.

When the alternating-current signals are of a known waveform and, in particular, sinusoidal with only a fundamental and no harmonics, each value is equally valid. However, measurement complications arise when the sinusoid is distorted, i.e., contains harmonic frequencies.

For example, peak value measurements are usually of little value when the alternating-current signal under measurement contains short duration pulses of relatively large amplitude. The pulses introduce considerable errors in attempting to measure the amplitude of the fundamental frequency of the alternating-current signal. Hence, instruments which apply a rectified alternating-current signal to a capacitor to develop a direct-current voltage which is then applied to a conventional direct-current meter are ineffective in measuring the amplitude characteristics of a sinusoid containing transient peaks of amplitude.

On the other hand, instruments which measure the average value of the alternating-currents have only limited accuracies when the alternating-current is a sinusoid containing as little as five percent of harmonic distortion. In such a case, there may be as much as a 1.6 percent error between the measurable average value and the true value of the fundamental frequency. This error is totally independent of the accuracy of the measuring instrument itself. At the same time, if an indication of the root-mean-square value of this sinusoid is desired, there may be a discrepancy between the average value and the root-mean-square value of as much as 1.5 percent. An instrument which measures the true root-mean-square value, however, can present waveform errors no greater than 0.13 percent when the fundamental value of a 5 percent distorted signal is desired.

It is, therefore, apparent that when the amplitude characteristics of sinusoidal alternating-current signals are being measured, conventional peak reading instruments or average reading instruments cannot logically be used when accuracies of better than plus or minus 2 percent are required, while an instrument that responds to the root-mean-square value of the signal can provide measurements virtually free of waveform errors.

In addition to these inaccuracies that are introduced because of the types of waveforms being measured, many present day instruments introduce further inaccuracies, particularly when signals within electronic circuits and other high impedance circuits are being measured. The loading effect of the meter is generally great enough and variable enough as a function of other parameters such as temperature and frequency to introduce further errors into the ultimate readings. The impedances associated with the meters are as a rule neither constant nor infinite and are often frequency or temperature sensitive. These factors accordingly introduce further errors into the readings and consequently limit the precision of the measuring devices.

It is accordingly an object of the invention to provide an improved signal measuring means.

It is a further object of the invention to provide an improved means for measuring alternating-current signals.

It is a further object of the invention to provide improved means for precisely measuring the root-mean-square value of alternating-current signals.

Briefly, in accordance with one embodiment of the invention, apparatus is provided for measuring the amplitudes of alternating-current signals which comprises a signal amplifying means having an input element and an output element. The input element is adapted to receive the alternating-current signals to be measured and the output element transmits an alternating-current. A current meter is provided for giving an indication of the amplitude of the alternating-current signal and means are provided for coupling the current meter between the input and output elements of the signal amplifying means to constrain the alternating-current transmitted by the output element to maintain a constant proportional relationship to the signals received by the input element.

Figure 2:
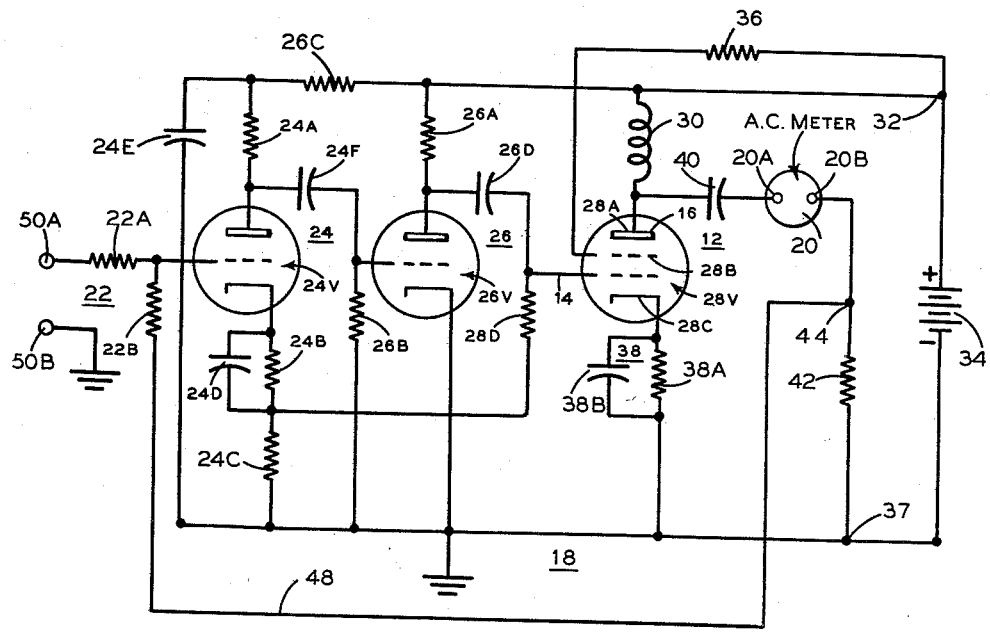

Other objects, features and advantages of the invention will be apparent from the detailed description when read with the accompanying drawings wherein:

FIGURE 1 is a symbolic representation of the signal measuring means in accordance with a preferred embodiment of the invention; and FIGURE 2 is a schematic diagram of the signal measuring means of FIGURE 1.

Referring to FIGURE 1, a signal measuring means 10 is shown comprising a signal amplifying means 12 having an input element or input means 14, an output element or output means 16, a feedback means 18, including feedback voltage resistor 42 coupling the output means 16 to the input means 14, a meter 20 disposed serially in the path of the feedback means 18, and a comparator 22 coupled to the input means 14.

During operation, an alternating-current signal is received at the input means 14 via a resistor $22a$ from a source of alternating-current signal. The signal amplifying means 12 transmits from its output means 16 an alternating-current signal which is proportional to the alternating-current signal received by the input means 14. This alternating-current signal flows through the meter 20 and the resistor 42. The voltage drop across the resistor 42 is fed back via the feedback means 18 to the resistor $22b$. The fedback alternating-current signal is fed via the resistor $22b$ to the input means 14. The feedback alternating-current signal is compared with the input alternating-current signal so that the amplitude of the alternating-current signal transmitted by the output means 16 through the meter 20 is directly proportional to the amplitude of the alternating-current signal received via the resistor $22a$ from the source of alternating-current signal. In particular, if it is assumed that:

$V_1$=voltage received from a signal source
$V_2$=voltage developed across resistor 42
$V_3$=voltage at the output of comparator 22, i.e., the signal received by amplifier 12
$K$=transconductance of amplifier $12 = \dfrac{Im}{V_3}$ $Im$=current flowing through meter 20
$i$=current through resistors $22a$ and $22b$
$R_{22a}$=resistance of resistor $22a$
$R_{22b}$=resistance of resistor $22b$
$R_{42}$=resistance of resistor 42; then (1) $\qquad V_1 - iR_{22a} = V_3$, or $i = \dfrac{V_1 - V_3}{R_{22a}}$ and (2) $\quad V_3 - iR_{22b} = V_2$, or $i = \dfrac{V_3 - V_2}{R_{22b}}$ Since $i$ is very much less than $Im$ it may be ignored and accordingly $V_2 = ImR_{42}$. Therefore—

(3) $\quad \dfrac{V_1 - \dfrac{Im}{K}}{R_{22a}} = \dfrac{\dfrac{Im}{K} - ImR_{42}}{R_{22b}}$ (4) $\quad Im = V_1 \times \dfrac{KR_{22b}}{R_{22a} + R_{22b} - KR_{42}R_{22a}}$ Thus, the alternating-current flowing through the meter 20 is always directly proportional to the amplitude of the received alternating-current signal regardless of the impedance characteristics of the meter 20. In other words, the signal measuring means 10 may be considered as a current feedback amplifier having a meter in its feedback path with the feedback path constraining the flow of current through the meter to follow the signal received by the amplifier.

In order to indicate precise root-means-square measurements of the alternating-current in the feedback path, the meter 20 is of the type whose operation is dependent upon the square of the current flowing through it. Although many such meters are available, such as iron vane meters and thermo-couple meters, the meter 20, to provide greatest precision, is preferably of the electro-dynamometer type. Basically, an electro-dynamometer comprises a fixed coil and a moving coil. The current fed to the meter flows serially through the coils. Thus, the torque on the moving coil is proportional to the square of the current flowing through the coils. This torque causes the moving coil to rotate against a biasing spring from a home position. It should be noted that this torque is the instantaneous torque at any one time. Therefore, over a period of time, the rotation of the moving coil is equal to the average torque or the mean-square current. By providing the moving coil with a pointer which sweeps over a calibrated scale, it is possible to obtain an indication of the root-mean-square of the current flowing.

FIGURE 2 shows the signal measuring means 10 of FIGURE 1 in greater detail. Although it is possible to connect the signal amplifying means 12 directly to the comparator 22, it is more desirable to interpose conventional voltage amplifiers to permit the measurement of alternating-current signals of extremely small amplitude.

Accordingly, the cascaded amplifiers 24 and 26 are serially interposed between the comparator 22 and the signal amplifying means 12. Since the amplifiers 24 and 26 are of conventional design, as shown, they will not be described in detail.

The signal amplifying means 12 includes a vacuum tube 28V having an anode 28a coupled via an inductor 30 to a first terminal 32 of a source of operating potential 34, a screen grid 28b coupled via screen dropping resistor 36 to the terminal 32 of the source of potential 34, a cathode 28c coupled via the biasing means 38 to a second terminal 37 of the source of operating potential 34, and a control grid which is the input element 14. The anode 28a is coupled via a capacitor 40 to one terminal 20a of meter 20. The second terminal 20b of meter 20 is coupled via a resistor 42 to the terminal 37 of the source of potential 34. The junction 44 of the meter 20 and the resistor 42 is coupled via a line 48 to the resistor 22b to provide current feedback means 18.

During operation, the alternating current signal to be measured is developed across the input terminals 50a and 50b which functions as a signal source of the signal to be measured. This signal, after comparison and voltage amplification by the cascaded voltage amplifiers 24 and 26, is fed to the input element 14 (control grid) of the vacuum tube 28V. This alternating-current signal on the input element 14 causes an alternating-current to flow via the capacitor 40 through the meter 20 and the resistor 42. The meter 20 accordingly produces an indication of the amplitude of the current flowing. Since this meter is preferably an electro-dynamometer, its indication will be proportional to the root-mean-square of the current flowing.

At the same time, the current flow causes the development of an alternating-current signal across the resistor 42. This alternating-current signal is fed back via the line 48 to the resistor 22b for comparison with the alternating-current signal received via the resistor 22a from the input terminals 50a and 50b. Whenever a difference exists between the alternating-current signal received from the input terminals 50a and 50b and the alternating-current signal received via the line 48, a difference signal is fed via the voltage amplifiers 24 and 26 to the signal amplifying means 12 to force a corresponding change in the current fed through the meter 20 and the resistor 42 so that the alternating-current signal developed across the resistor 42 again approaches a proportionate value of the signal received by the terminals 50a and 50b. By way of example, assume resistor 22a is equal to resistor 22b, resistor 42 has a resistance of 96 ohms and the transconductance is equal to the $\frac{1}{96}$ ohms, then:

$$Im = 0.0104 V_1$$

Thus for every volt of signal from the signal source 10.4 milliamperes of current flows through meter 20.

In this way, the alternating-current flowing through the meter 20 is constrained to follow the alternating-current signal that is being measured. Thus, regardless of the characteristics of the meter 20, the current flowing through it is always proportional to the amplitude of the alternating-current signal being measured.

Hence, in spite of the fact that electro-dynamometers and iron vane meters have inherent inductances which present frequency sensitive impedances, these inductances in no way affect the measurements being performed and accordingly the signal measuring means 10 is in no way frequency sensitive. Furthermore, if the meter 20 is of the thermocouple type, there will be no inherent errors because of the temperature sensitive effects which change the impedance of the meter.

There has thus been shown an improved alternating-current measuring means which is highly precise since the meters employed truly indicate mean-square currents and consequently can be adapted to read root-mean-square voltages by scale calibrations.

Furthermore, in addition to the improvements in accuracy obtained by using meters for measuring root-mean-square currents, the signal measuring means 10 is additionally precise since current feedback means are employed which constrain the alternating-current flowing through the meter to follow the alternating-current signals being received for measurement.

In a working embodiment the following are representative values of the elements of FIGURE 2:

Resistor 22a = 330,000 ohms
Resistor 22b = 330,000 ohms
Resistor 24a = 470,000 ohms
Resistor 24b = 3,900 ohms
Resistor 24c = 470 ohms
Resistor 26a = 470,000 ohms
Resistor 26b = 10,000,000 ohms
Resistor 26c = 47,000 ohms
Resistor 28d = 470,000 ohms
Resistor 38a = 4,700 ohms
Resistor 42 = 96 ohms
Resistor 36 = 47,000 ohms Capacitor 24d = 60 µf.
Capacitor 24e = 20 µf.
Capacitor 24f = .22 µf.
Capacitor 26d = 2.0 µf.
Capacitor 38 = 1500 µf.

Capacitor 40=6µf.
Inductor 30=15 hy.
Vacuum tube 24V=½—5751.
Vacuum tube 26V=½—5751.
Vacuum tube 28V=6V6.

It will now be obvious to those skilled in the art that many modifications and variations exist which accomplish all the objects and realize many or all of the advantages but which do not depart from the spirit of the invention as defined in the claims which follow.

What is claimed is:

1. Apparatus for measuring the alternating-current from a source of alternating-current signals comprising a pair of input signal terminals for connection to said source, a source of operating potential having first and second terminals at different potentials, a voltage amplifying means having a pair of input terminals and an output terminal, means for operatively coupling said voltage amplifying means to the first and second terminals of said source of operating potential, means including a first resistor for coupling one input terminal of said voltage amplifying means to one input terminal connected to said source of alternating-current signals, means for operatively coupling the second input terminal for said source of alternating-current signals to the other input terminal of the voltage amplifying means, a vacuum tube current amplifier having at least an anode, cathode and a control grid, means for coupling said anode to the first terminal of said source of operating potential, means for coupling said cathode to the second terminal of said source of operating potential, means for coupling said control grid to the output terminal of said voltage amplifying means, an electro-dynamometer having first and second terminals, means for coupling the first terminal of said electro-dynamometer to said anode, a second resistor, means for coupling one end of said second resistor to the second terminal of said electro-dynamometer, means for coupling the other end of said second resistor to the second terminal of said source of operating potential, and a negative feedback circuit including only resistance for coupling the junction between said electro-dynamometer and said second resistor to said one input terminal of said voltage amplifying means so that the alternating-current flowing through said electro-dynamometer is constrained to be proportional to the alternating-current from said source of alternating-current signals.

2. Signal measuring apparatus for deriving the root-mean-square value of a measured signal, said apparatus comprising
   two input signal terminals for connection to a signal source to receive a signal to be measured;
   an amplifier having an input circuit with two terminals and an output circuit with two terminals;
   a first series resistor having an input end electrically connected to one said input signal terminal and having an output end to be coupled to one terminal of the input circuit to the amplifier;
   means operatively coupling the other said input signal terminal to said other terminal of the input circuit to the amplifier;
   a frequency sensitive meter for measuring root-mean-square values of an applied current;
   a second series resistor having an input end and an output end;
   means connecting the meter in series circuit relation with said second series resistor with one terminal of the meter connected to one output terminal of the amplifier and the output end of said second resistor connected to said second output terminal of the amplifier, the second terminal of the meter and the input terminal of said second series resistor being joined to provide a juncture point;
   and a negative feedback circuit of solely resistive means connected from said juncture point at the input terminal of said second series resistor to the output terminal of said first series resistor.

3. Signal measuring apparatus for deriving the root-mean-square value of a measured signal, said apparatus comprising,
   an amplifying circuit having a pair of input terminals and including an electron discharge device having an electron emitting electrode, an electron collecting electrode and a control electrode,
   a pair of terminals connectible to the source of signals,
   means coupling the control electrode to one of the terminals coupled to the source of signals and including a resistor connected in series between one of the input terminals of the amplifying circuit and one of the terminals connectible to the source,
   means coupling the other of the terminals of the source of signals to the other of the input terminals of the amplifying circuit,
   means coupling the electron emitting electrode to the other of the terminals of the amplifying circuit,
   a series network comprising an electrical dynamometer and a second resistance connected in series and coupled between the collector and emitting electrodes, said dynamometer being operative to measure root-mean-square values of the output signal from the electron collector electrode,
   a negative feedback circuit containing only resistance connected between the junction of the dynamometer and the second resistance and the one of the input terminals of the amplifying circuit,
   and a source of energizing potential connected between the electron emitting and electron collecting electrodes.

References Cited in the file of this patent

UNITED STATES PATENTS

| 1,992,022 | Bedford | Feb. 19, 1935 |
| 2,358,480 | Skilling | Sept. 19, 1944 |
| 2,368,351 | Ewen | Jan. 30, 1945 |